(12) United States Patent
Magaldi et al.

(10) Patent No.: US 6,230,633 B1
(45) Date of Patent: May 15, 2001

(54) CONVEYOR/COOLER OF LOOSE MATERIALS

(76) Inventors: Mario Magaldi, 22, Viale del Bosco, I 84100 Salerno; Alberto Carrea, 20/5a, Corso Italia, I 16145 Genova, both of (IT)

( * ) Notice: Subject to any disclaimer, the term of this patent is extended or adjusted under 35 U.S.C. 154(b) by 0 days.

(21) Appl. No.: 08/973,549

(22) PCT Filed: Jun. 15, 1996

(86) PCT No.: PCT/EP96/02625

§ 371 Date: Mar. 27, 1998

§ 102(e) Date: Mar. 27, 1998

(87) PCT Pub. No.: WO97/00406

PCT Pub. Date: Jan. 3, 1997

(30) Foreign Application Priority Data

Jun. 19, 1995 (IT) ............................................. MI95A1310

(51) Int. Cl.⁷ ................................ F23N 5/00; F23J 1/00; F23D 13/00; F23D 19/02
(52) U.S. Cl. ...................... 110/189; 110/165 R; 110/259; 122/4 D; 165/104.16; 165/104.18; 165/286; 414/161; 414/216
(58) Field of Search ................................ 110/245, 165 R, 110/165 A, 170, 259, 266, 267, 268, 286, 258, 185, 186, 188, 189; 122/4 D; 414/159, 161, 147; 165/6, 104.16, 104.18, 286

(56) References Cited

U.S. PATENT DOCUMENTS

| Re. 34,814 | | 1/1995 | Magaldi . | |
|---|---|---|---|---|
| 970,868 | * | 9/1910 | Wood | 110/165 R |
| 1,341,582 | * | 5/1920 | Philo | 110/268 |
| 2,200,326 | * | 5/1940 | Bressler | 110/286 |
| 2,481,504 | * | 9/1949 | Ferro et al. | 110/258 |
| 3,042,500 | * | 7/1962 | Godel | 110/165 R X |
| 3,133,804 | * | 5/1964 | Hardgrove | 110/165 R |
| 3,185,457 | * | 5/1965 | Boll et al. | 165/104.18 X |
| 3,242,975 | * | 3/1966 | Kogan | 165/104.18 |
| 3,477,703 | * | 11/1969 | Tamalet | 165/104.18 X |
| 3,550,920 | * | 12/1970 | Geipel et al. | 165/104.18 X |
| 3,627,036 | * | 12/1971 | Gilbert | 165/6 X |
| 3,684,259 | * | 8/1972 | Saul | 165/104.18 X |

(List continued on next page.)

FOREIGN PATENT DOCUMENTS

| 1751512 | * | 10/1970 | (DE) . | |
|---|---|---|---|---|
| 618632 | * | 2/1949 | (GB) | 165/104.18 |
| 1147129 | * | 4/1969 | (GB) | 165/104.16 |
| 6320132 | * | 11/1994 | (JP) | B09B/3/00 |
| 7 000 362 | | 7/1970 | (NL) . | |
| 91 13293 | | 9/1991 | (WO) . | |

OTHER PUBLICATIONS

Patent Abstracts of Japan, vol. 13, No. 334, Jul. 27, 1989 & JP 1–111122, Kawasaki Heavy Ind. Ltd., Apr. 27, 1989.
Patent Abstracts of Japan, vol. 9, No. 63, Mar. 20, 1985 & JP 59–197714, Babcock Hitachi, Nov. 9, 1984.

*Primary Examiner*—Ira S. Lazarus
*Assistant Examiner*—Ljiljana V. Ciric
(74) *Attorney, Agent, or Firm*—Foley & Lardner

(57) ABSTRACT

A conveyor/cooler of hot loose materials produced by fluid bed boilers and various industrial processes includes one or more feeding channels, which are substantially vertical or at any inclination. Because of gravity, the material leaves the combustion chamber of the boiler. A metallic container is connected to the downstream end of the discharging channels. A metallic conveyor belt driven by a motor is placed within the container, and the material from the downstream end of the channels is laid on the conveyor belt, thus forming a travelling continuous bed. The belt therefore constitutes a regenerative heat exchanger which absorbs heat from the material during the forward run and gives it back to the air during the backward run.

23 Claims, 11 Drawing Sheets

U.S. PATENT DOCUMENTS

| | | | |
|---|---|---|---|
| 3,697,055 | * 10/1972 | Cooper | 165/104.18 X |
| 3,865,053 | * 2/1975 | Kolze et al. | 110/7 A |
| 3,915,105 | * 10/1975 | Michelbrink | 110/165 R |
| 4,331,084 | * 5/1982 | Fitch et al. | 110/186 |
| 4,532,872 | * 8/1985 | Anderson | 110/255 |
| 4,630,552 | * 12/1986 | Lovgren | 110/190 |
| 4,723,494 | 2/1988 | Kerr . | |
| 4,739,715 | * 4/1988 | Couarc'h et al. | 110/346 |
| 4,765,256 | * 8/1988 | Caughey | 110/165 R X |
| 4,846,082 | * 7/1989 | Marangoni | 110/234 |
| 4,953,474 | * 9/1990 | Armitage | 110/101 CD |
| 5,020,452 | * 6/1991 | Rybak | 110/241 |
| 5,255,615 | * 10/1993 | Magaldi | 110/234 |
| 5,660,124 | * 8/1997 | Doncer | 110/227 |
| 5,794,548 | * 8/1998 | Barlow | 110/104 R |

\* cited by examiner

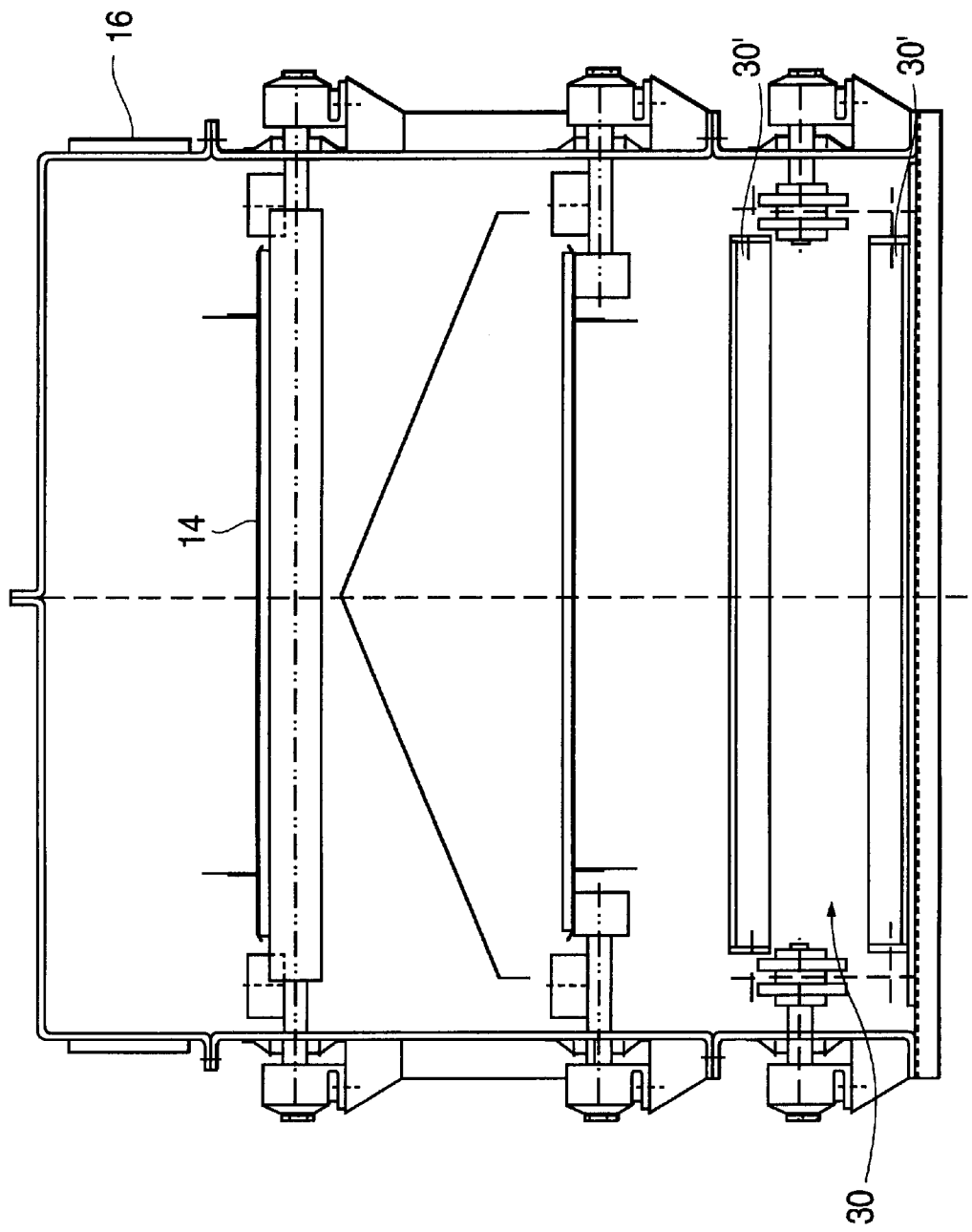

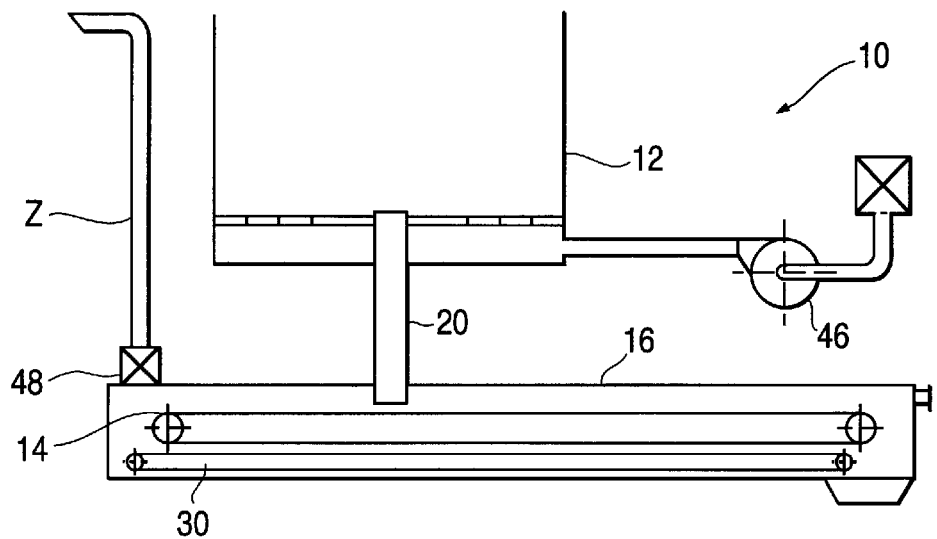
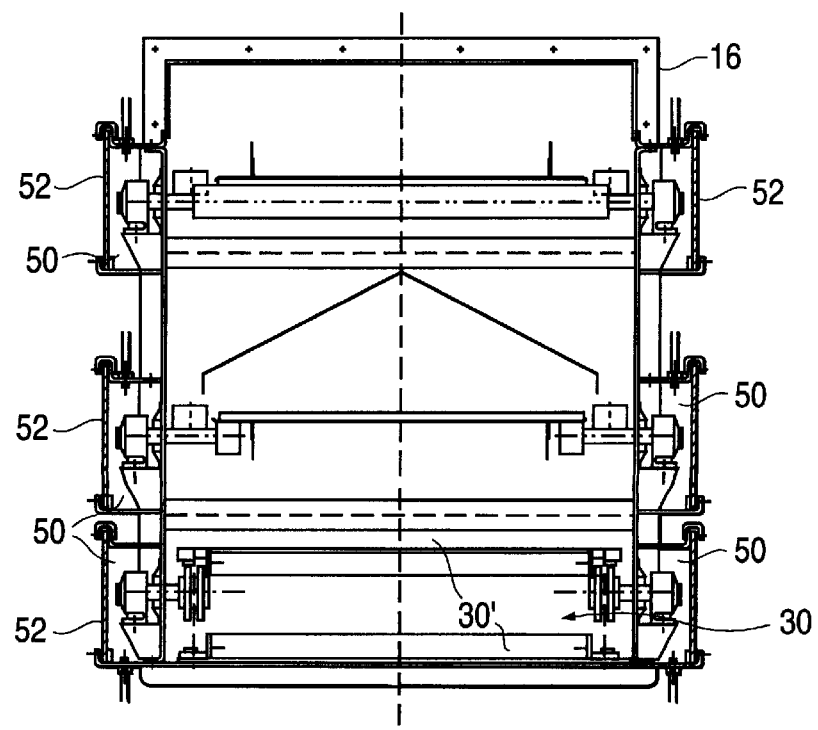

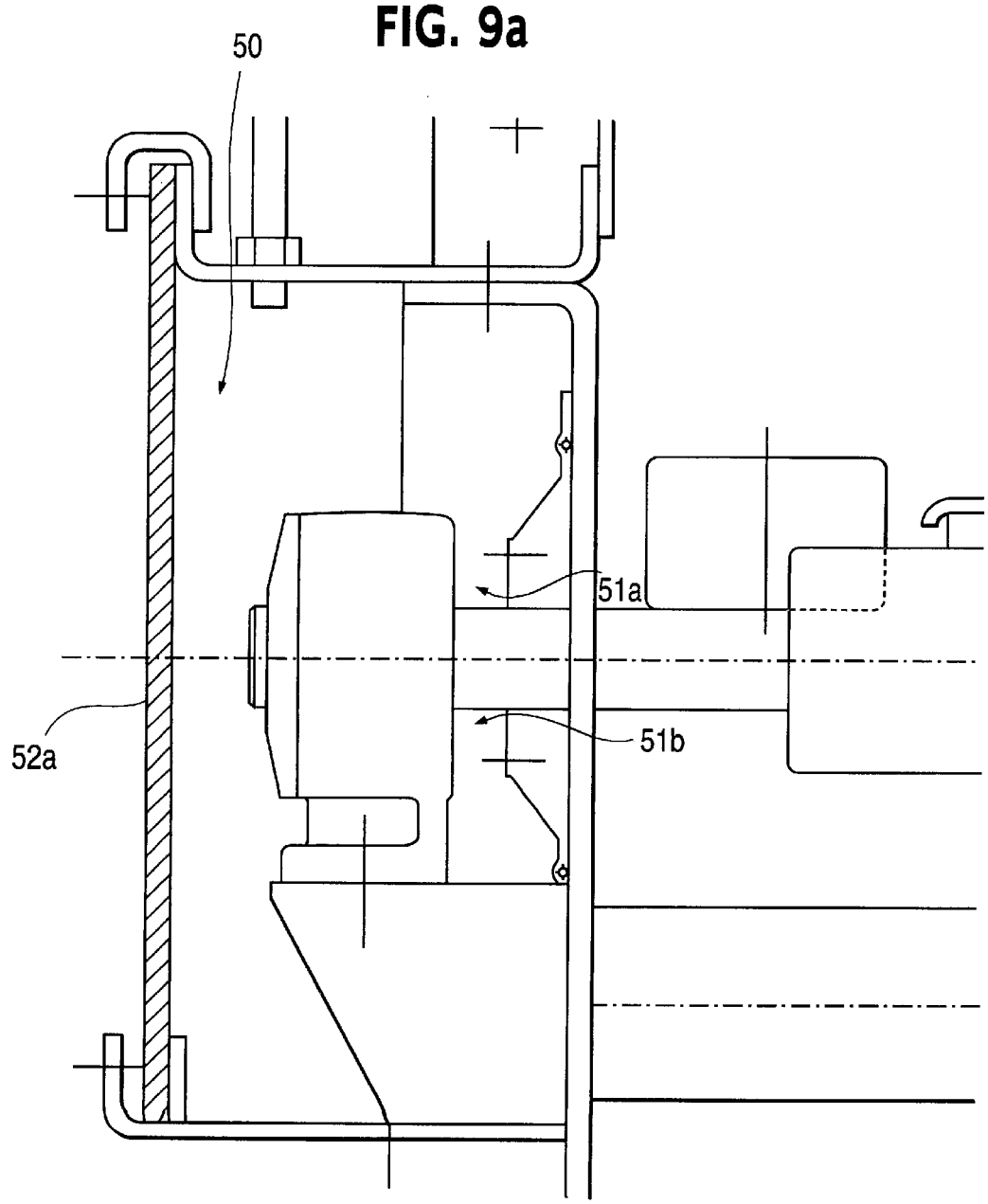

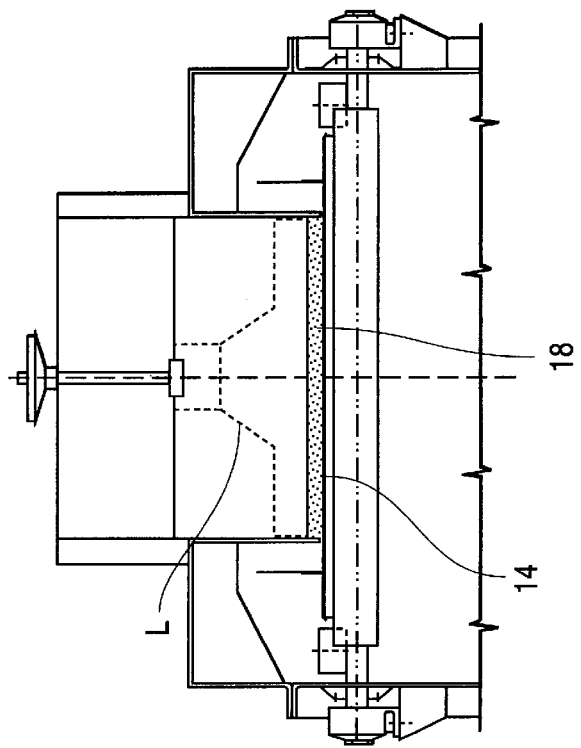
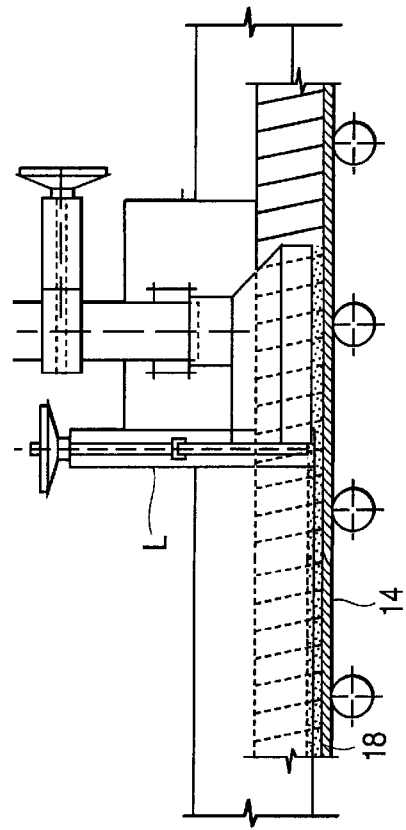

CONVEYOR/COOLER OF LOOSE MATERIALS

The present invention relates to a conveyor/cooler of loose solid materials with small particle size, such as bottom ash produced by fluid bed boilers or casting sand, sintered power, cement clinker, slag or small particle size minerals produced during various industrial processes of burning, cooking, sintering etc. While the present invention is applicable to treating various hot solid loose material, such as the above listed, a preferred use thereof is to treat ash produced in fluid bed boilers which will be referred to in the following as an exemplary and not limiting embodiment.

In fluid bed burners, the more used system for extraction and cooling of ashes (which exit from the combustion chamber at temperatures around 800–900° C.) is constituted by a water cooled scroll (the water cools both the external shell and the scroll). But such a system has the following drawbacks:

high wear because of the erosion action exerted by the ash (which has a high content of silica and other abrasive materials) on the metallic parts both of the scroll screw and the shell;

danger, because of the fast wear of the shell, of creation of slits which, causing the water to contact high temperature ashes, could cause a danger of explosions because of the fast evaporation of water;

possibility of sudden stops of the scroll in case there are hard materials having sizes higher than the distance between the scroll screw and the enclosing shell; and dispersion into the environment of the whole heat content which cannot be recovered.

In addition to the above, there exists the problem of a high consumption of water for carrying out cooling. Water currently has a very high value and must be safeguarded from any kind of pollution.

The above mentioned problems and shortcomings are overcome by the conveyor/cooler according to the present invention. Further advantageous features of the invention are also set forth in this disclosure.

The characteristics, objects and advantages of the invention will become more evident from the following disclosure and the annexed drawing relating to non limiting embodiments wherein the various figures:

FIG. 4 is a diagrammatic cross section of the metallic belt conveyor/cooler according to the present invention;

FIG. 7 is a view similar to FIG. 6 and represents a diagrammatic view of the vacuum device not provided with energy recovery into the boiler;

FIG. 9 is a diagrammatic view of the sealing lateral chamber into conveyor/cooler according to the present invention, used in the embodiment under pressure;

FIG. 9A is a detailed view of chamber 50 as shown in FIG. 9;

FIGS. 12, 12a, 13 and 13a show lateral and front views respectively, of a transition member connected to the device adapted to make the thickness uniform.

The same reference numbers through the various figures indicate the same or equivalent parts. While the present invention is applicable to treating various hot solid loose material, a preferred use thereof is to treat ashes produced in fluid bed boilers which will be referred to in the following as an exemplificative and not limiting embodiment.

Figure 1:
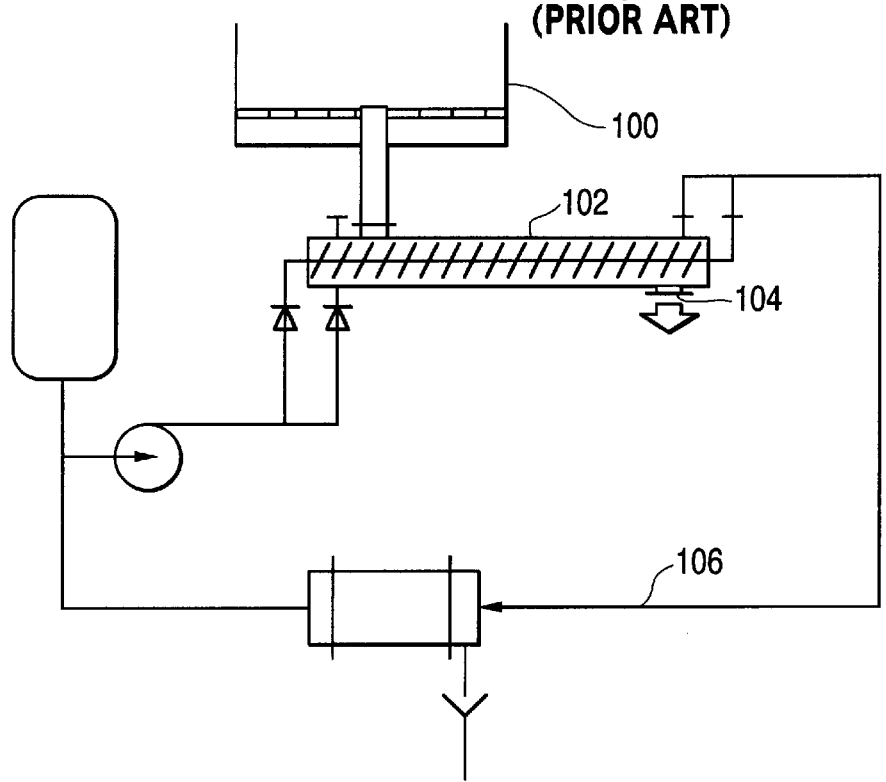
FIG. 1 is a diagrammatic view of a known apparatus of the prior art for conveying loose materials, with a water cooled scroll.

FIG. 1 is a diagrammatic view of a prior art apparatus for conveying loose materials, having a water cooled scroll which has the above disclosed shortcomings. Briefly, for clarity of disclosure, reference number 100 is for the boiler, the ash of which are conveyed by scroll 102 which has an ash exit 104 to the processing system. Further, the cooling water circulating path 106 is also diagrammatically shown.

The conveyor/cooler 10 according to the present invention uses, for conveying and cooling of loose materials, such as particularly ashes and other combustion matter from fluid bed boilers 12, a metallic conveyor belt means 14, preferably made of steel, inserted into a sealed metallic container 16 (see FIG. 2) and driven by a motor means.

Ash 18 leaves the combustion chamber of boiler 12 by gravity through one or more vertical discharge channels 20 also used as pressure separation means. The amount of material to be extracted is adjusted according to a pressure signal or an overpressure signal generated at a predetermined height in the container bottom area where the discharge tubes dip and which contains material to be discharged. Below such channels or tubes 20, at a distance such that passage of pieces of materials 18 having the largest available size (but less than ⅓ of the tube diameter, as its minimum size), the metallic conveyor belt 14, on which the material is laid forming a continuous bed which is moving toward the exit area 22, is provided.

Cooling of material 18 is mainly carried out by means of air flowing against the stream with respect to material itself; the air could be both forced from outside to inside the metallic container 16 through a ventilation means (and in such a case the cooler operates at a positive pressure with respect to outside) or drawn inside the container naturally by generating in it a negative pressure. Choosing either the under pressure operation or the negative pressure operation will be dependent on the convenience of interfacing conveyor/cooler 10 to the process from which the hot material to be cooled comes, as will be clear from the following disclosure. Conveyor/cooler 10 can operate according to two different modes, depending on needs of cooling and conveyor/cooler 10 length which, in particular cases, could also be used to convey material in addition to or in place of conveying for cooling.

While the apparatus is operating under pressure (diagrammatically shown in FIG. 2) the heat exchange is carried out naturally, without material mixing means for augmenting heat exchange between hot material and cooling air. In such a mode it will be convenient to distribute material on the belt itself in a uniform manner and in thin layers to the end of augmenting the exchange surface. Material will transfer heat upwardly by radiation (to the top of metallic container, which in turn, by convection, will transfer heat to both internal and internal air. Material will also transfer heat downwardly to the belt itself by contact. Belt 14 could transfer heat to the air which is inside the cooler both during forward (by means of its down side) and backward (by means of both sides) runs.

Figure 3A:
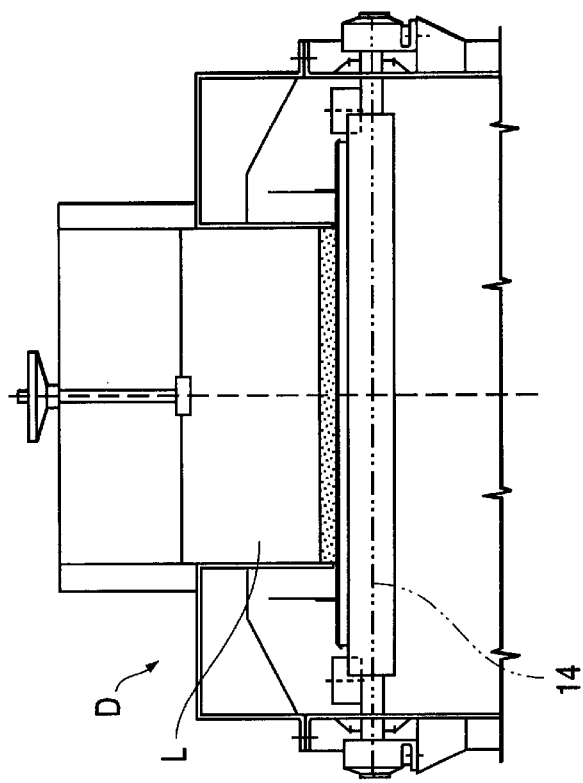
FIGS. 3 and 3a are side and front diagrammatic views, respectively, of one embodiment of the device for distributing material on the belt according to the present invention.
Figure 3:
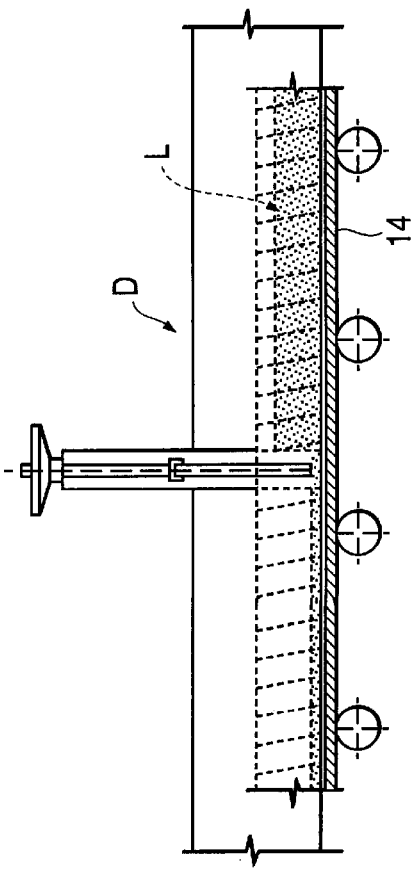
Figure 3C:
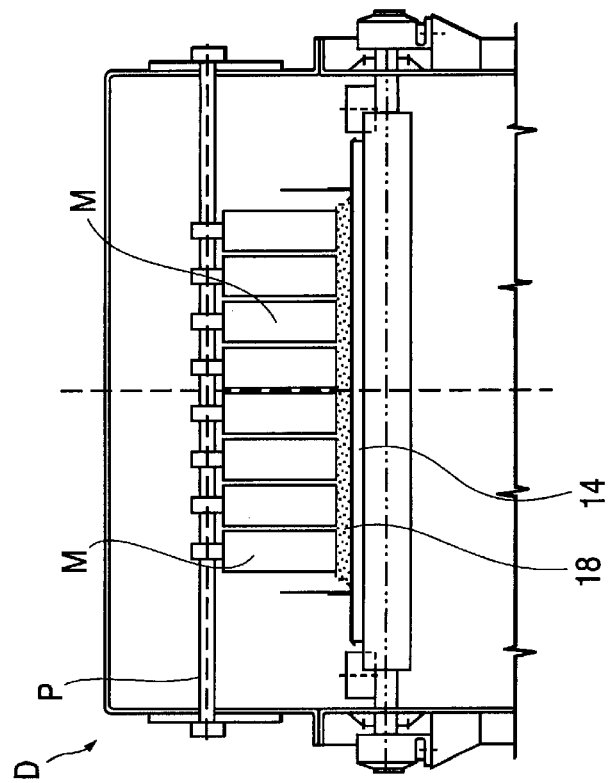
FIGS. 3b and 3c are side and front diagrammatic views, respectively, of a second embodiment of the device for distributing material on the belt according to the present invention.
Figure 3B:
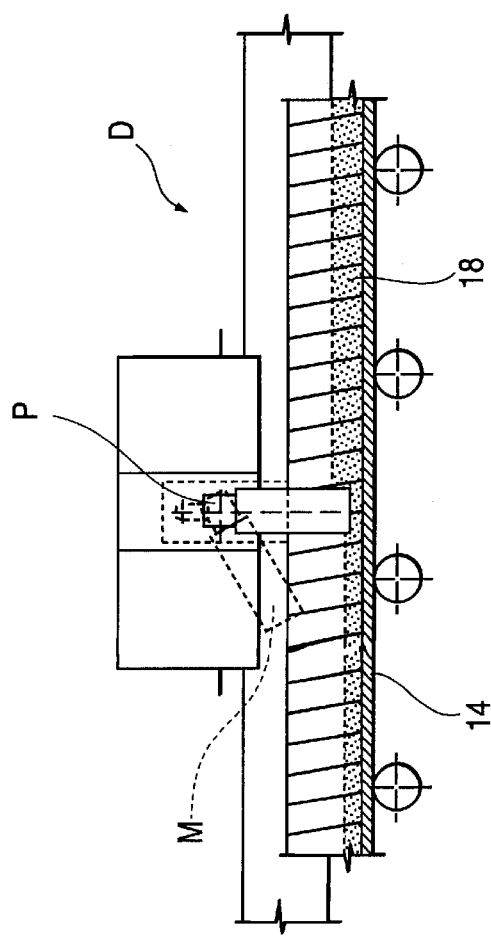
Figure 5:
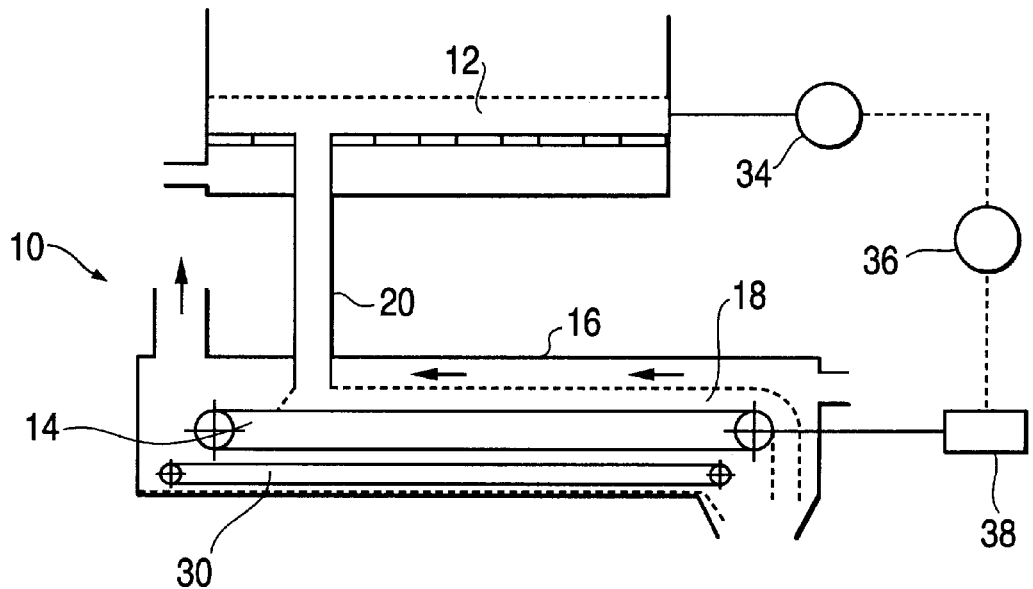
FIG. 5 shows a diagrammatic view of the device for adjusting the extraction speed.

To the end of distributing material in an even manner, downstream from the discharge area a material distributing means D is provided. According to particular cases the means for obtaining the desired material height could be constituted by an adjustable height blade L (to the end of providing adjustment of material 18 on belt 14) shown in FIGS. 3 and 3a or a set of hammer M with oscillating means P hinged to a bar the height thereof is adjustable, shown in FIGS. 3b and 3c. The first assembly is used in case the layer height is larger than the provided maximum dimension of material pieces to be cooled; the second one is applicable where the dimension could be higher than the desired material 18 layer thickness.

Feeding channels 20 are preferably provided with a safety mechanic control device (not shown) (such as blade valves) and sensor means (not shown) which control the material level 18. The level has to be such as to provide separation between the combustion chamber environment (in the down part thereof, as it is known, there exist a pressure which is around that of one meter of water column) and the pressure of metallic container 16 of said conveying/extractor belt 14 (which operates at a different pressure).

Figure 2:
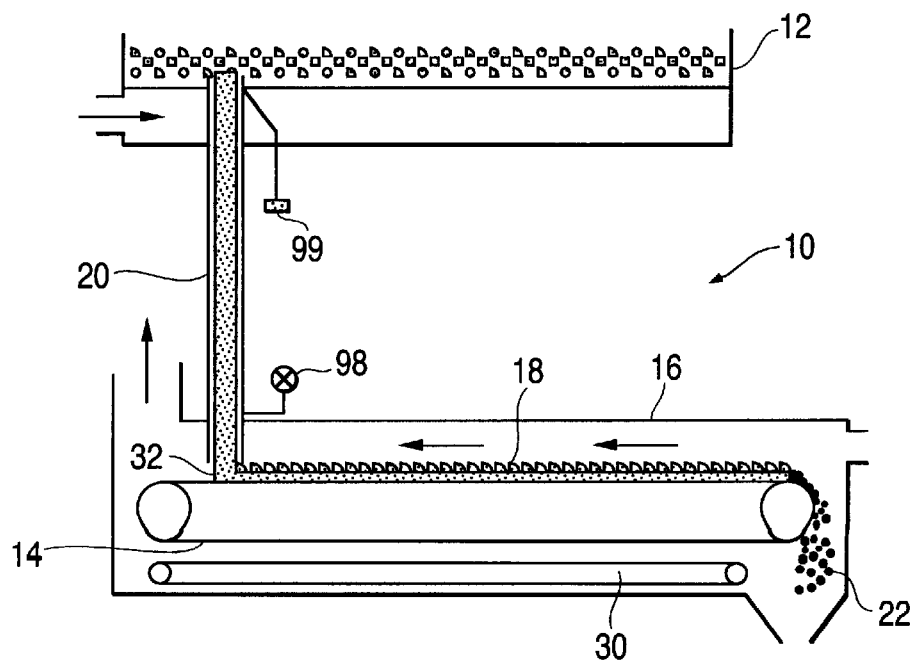
FIG. 2 is a diagrammatic view of an apparatus according to the present invention for conveying/cooling loose materials such as ash from fluid bed boilers.

In FIG. 2, as well as in FIGS. 4–9, a chain system means 30 provided with scrapers 30' is also shown, said scrapers rubbing against the container 16 bottom for conveying toward the exit the powdery material which is dropped from belt 14 and deposited onto the bottom.

At the bottom end of the discharging channels, a special transition valve assembly 24 provides for the following functions:

it prevents the ash discharge tubes 20 from becoming empty in case material 18 is extremely fluid;

it distributes ash 18 along the whole length of belt 14 in a thin layer so that the heat exchange surface is enhanced, both for radiation (toward the top and bottom), convection (toward the top), and conduction (toward the bottom because of the contact with the metallic belt 14); and it allows passage of pieces of excessive size.

The gap which provides material passage under the bottom edge of the transition valve or device could be adjustable to the end of obtaining a desired thickness on the belt. The transition valve will be connected to the belt metallic container. The transition valve is also connected to the part of discharge tube integral to combustion chamber such that the joint therebetween allows for expansions caused by the high temperatures.

To the end of avoiding the corrosive action caused by high temperature material contacting parts subjected to friction, a coating of a ceramic material could be placed on them with the coating having a desired thickness and desired characteristics. Also, to the end both of reducing metallic part temperature and thermal recovery, thermal recovery fins could be fixed to the upper part of transition valve. The finning could also be fixed to a wide or narrow area of discharge tube(s).

In the upper part of tube 20 a sensor 99 is provided, the sensor being adapted to detect possible material low level. The sensor drives a valve 98 to close when no material is detected. In such a way, the necessary separation between the boiler combustion chamber 12 and conveyor/cooler 10 is provided, even during irregular operating conditions.

To the end of withstanding the abrasion exerted by the hot ash on the metallic parts subjected to rubbing, a coating of ceramic material or any other anti-wearing material of a desired thickness is preferably added at the bottom end of the feeding channel(s). A cross section of the belt conveyor/cooler is shown in FIG. 4.

The thickness of the material 18 layer on belt 14 is adjusted with respect to the particle size of the ash and to the cooling needs. As the thickness is set, the ash capacity is adjusted by changing the moving speed of belt 14 in accordance with a signal from an overpressure sensor placed at a predetermined height in the bottom area of the fluid bed (so to maintain the operating parameters of the fluid bed, namely pressure or overpressure, at the desired value) (see FIG. 5). In place of a signal from an overpressure sensor, any other variable indicative of the amount of material to be discharged may be alternatively used. Such an adjustment could be carried out automatically by an adjusting or a control loop including transmitter 34 of the variable to be controlled (pressure or overpressure of the bottom area of the fluid bed), and a controller 36 for delivering the exit signal and a frequency converter 38, which regulates revolutions of belt driving motor in accordance with the received signal.

Belt 14 is, as above mentioned, enclosed into a sealed container 16; as above mentioned the conveyor/cooler can operate, depending on the interface criterions between the extraction system and the boiler, either under vacuum with respect to the atmosphere or under conditions.

In one case, two kinds of interfaces with the combustion chamber are available, depending on whether or not it is convenient to use the heat recovery possible with the extraction system.

Figure 6:
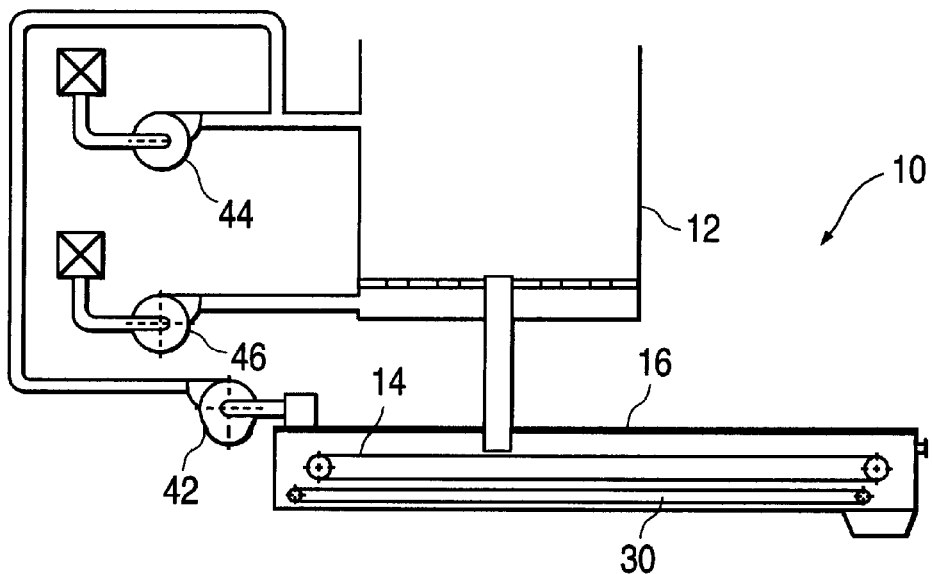
FIG. 6 shows a diagrammatic view of the device embodiment which operates under vacuum with respect to environment and provides energy recovery into the boiler.

To the end of using the possibility of heat recovery which is allowed by the system, the assembly of FIG. 6 is provided.

In such a case, the external air, drawn in the desired amount (the air amount entering the extractor depends on the size of the air intake or it is adjustable by installing proper variable feeding valves) by the vacuum at which the belt 14 container 16 operates, absorbs heat delivered by the ash because of the contact between air and the ash itself, with container 16 walls which are heated by radiation, with the metallic belt 14, both during its forward and backward runs (we have to take into consideration that in this specific case, the belt operates as a regenerative heat exchanger because it absorbs heat from ashes during the forward run and it delivers such a heat to the air during the backward run) and generally with all the metallic surfaces impinged by air during its travel.

The so heated air can be fed back into combustion chamber of boiler 12, thus joining it to the primary or secondary combustion air (preferably to secondary air because of the low pressure at which it is introduced into combustion chamber), this could happen through an additional fan 42 of primary or secondary air 44 and 46, respectively, which allow the air exiting from extractor container to be brought to the requested pressure.

In case it is not believed necessary to reuse the recovered heat energy (see FIG. 7), it is also possible to discharge the air into the atmosphere after proper filtering by a filter means 48, by using the chimney Z effect which is caused by hot air or an ejection fan (not shown) according to particular cases and operating conditions.

The vacuum operation of the system eliminates any problem concerned with the exit of powders and gases and allows inspection of the extractor 10 also during operation without any inconvenience. The openings can be sized to provide the appropriate air feeding. They could have a fixed area or a variable area, if a cooling area control is required.

On the other hand, it makes the reuse of heat recovery more complicated due to the need for a further machine (fan 42) which must operate in hard working conditions (high temperature and powders).

Figure 8:
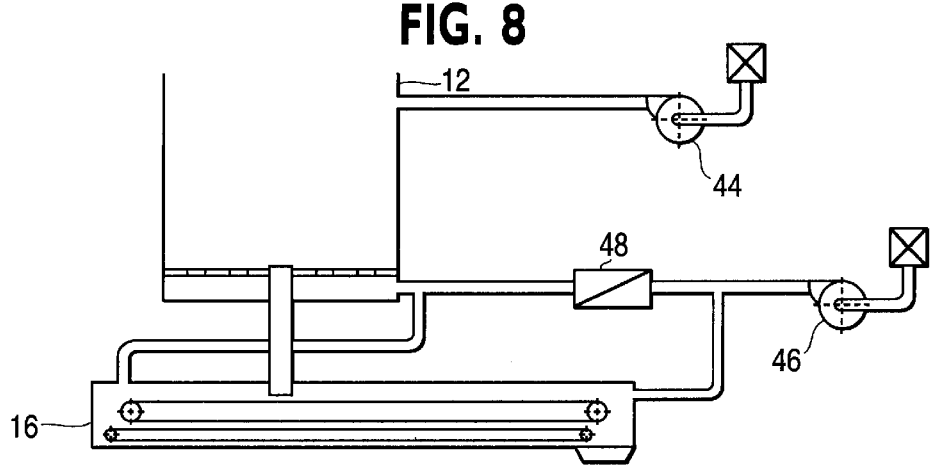
FIG. 8 is a schematic view of the device in its embodiment under pressure.

The operation under pressure eliminates these shortcomings because it uses, for cooling ashes, air taken from delivery of one of the primary or secondary air fans (primary air fan 46 in FIG. 8) which, before being fed into boiler, travels through the ash extractor or indeed its metallic container 16 (see FIG. 8).

This arrangement, on one hand makes easier the interfacing with boiler, and on the other hand requires special measures for preventing exiting of powders, both for environmental problems and for powder infiltration in the seals placed between containing wall and rollers or guide and transmission drums.

A solution for this problem is to arrange all the powdery air exiting sites (i.e., locations where powdery or dust-laden air leaks out, such as exit sites 51a and 51b shown in FIG. 9A) within a chamber 50 maintained under a pressure slightly higher than the inner pressure, said chamber could have one or more external transparent walls (such as wall 52a shown in FIG. 9A), of properly stiffened glass, for example for providing visual inspection of the roller operation (see FIG. 9).

According to the operating conditions (where, for example it is necessary to discharge ashes at low temperature, or high ash capacity, or when there is the possibility to have a proper extractor length suitable for the cooling requirements) it could be necessary to increase the heat exchange between ashes and air beyond the value allowed by the illustrated system while a forced drive of solid material on belt is not used.

Figure 10:
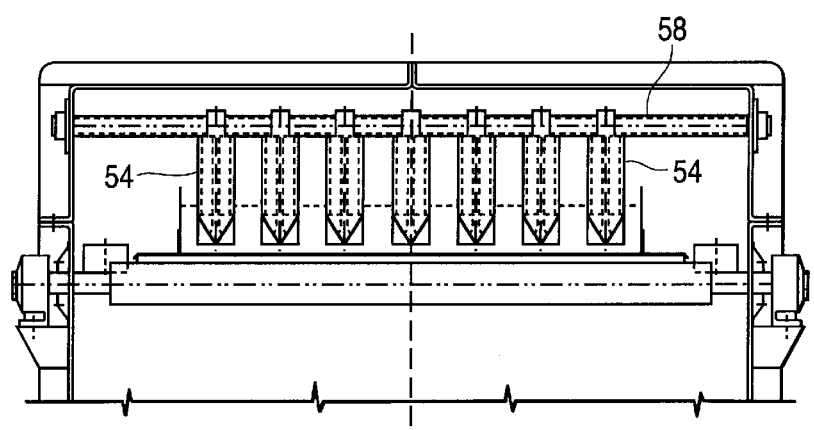
FIG. 10 is a frontal diagrammatic view of the mixing devices in the form of cooling plowshares according to the present invention.
Figure 11:
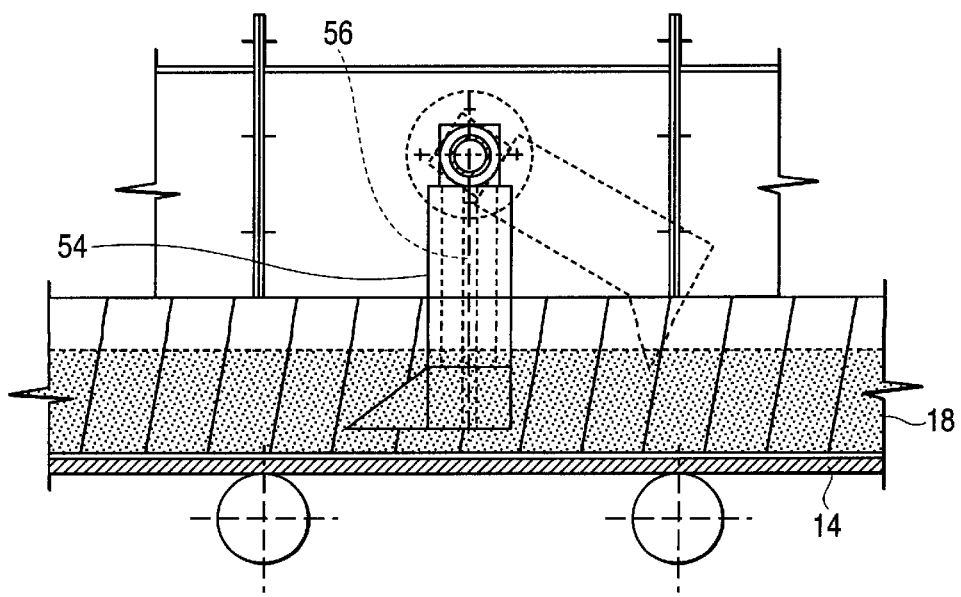
FIG. 11 is a side view thereof.
Figure 13:
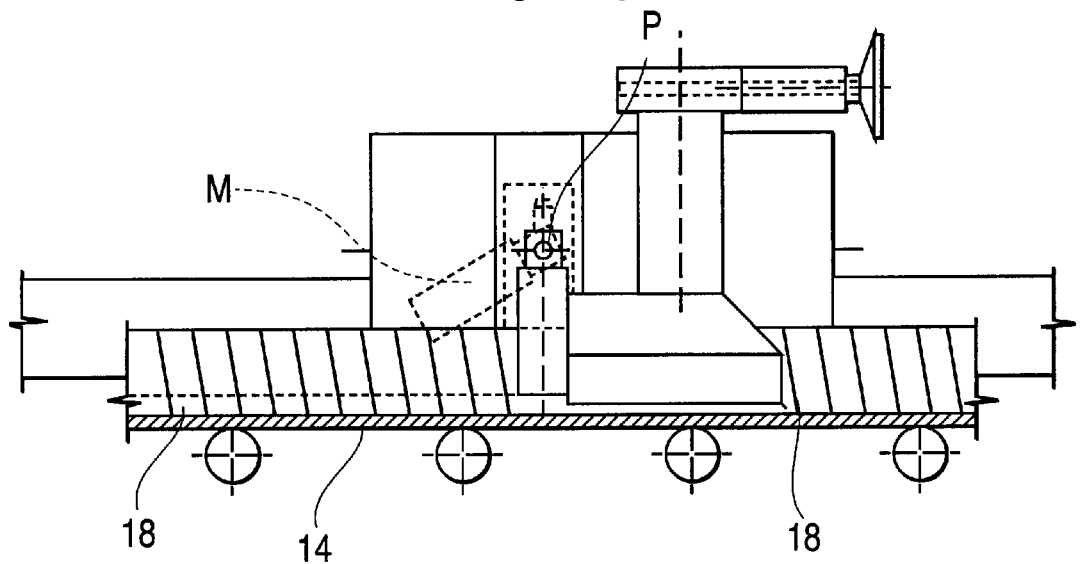
Figure 13A:
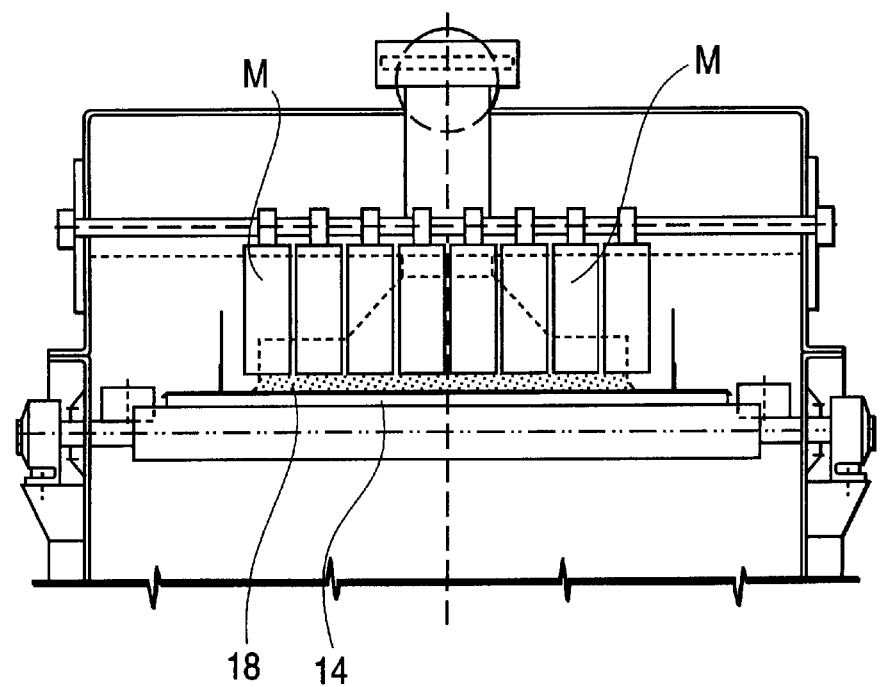
Figure 14B:
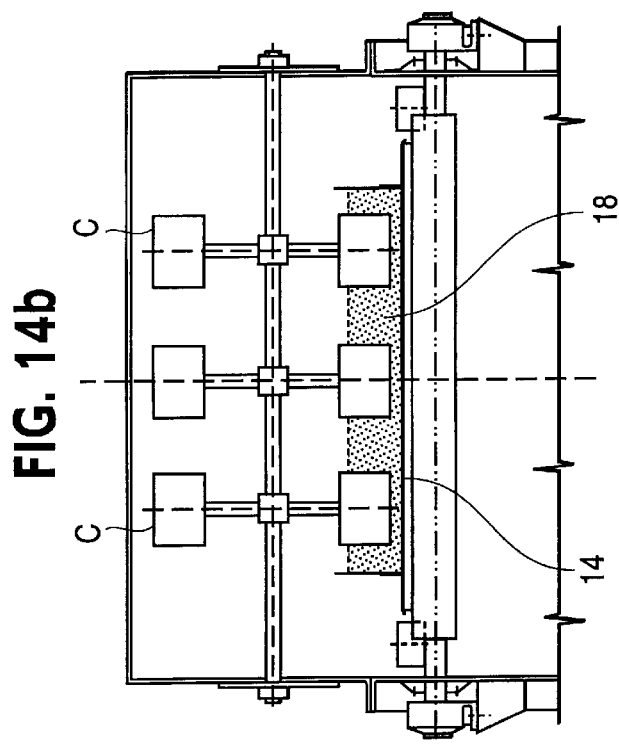
FIG. 14a is a diagrammatic side view of proper spoon mixers and FIG. 14b is a frontal view thereof.
Figure 14A:
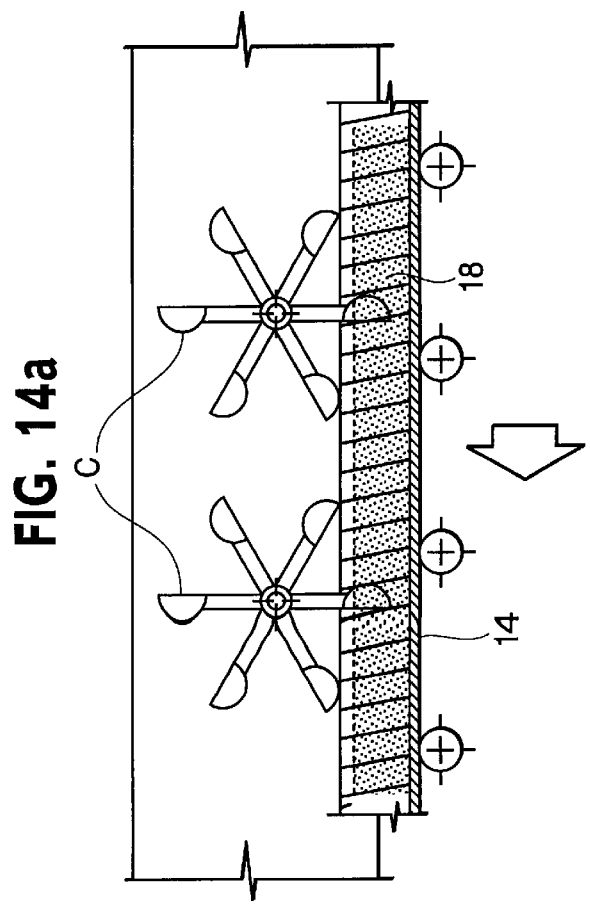

This can be made in various ways:
each of the feeding channels from combustion chamber to the belt can be constituted by two concentric tubes (not shown but evident for a man skilled in the art), externally finned, if necessary. In such a case, air coming from extractor flows through the annular gap existing between the two tubes, increasing the ash cooling and the heat energy recovery as well as the personnel safety;
insertion of metallic surfaces (not shown) with a high or low number of fins according to the need, between belt and container roof which, by absorbing the ash radiated heat, increase the air exchange surface. The surfaces also constituting an optical shield between ashes and the external upper wall of container, will be able to maintain the container external surface at an acceptable value;
spraying of atomized water on the bottom part of belt during the forward travel or on the upper part during backward travel, for the purpose of lowering the temperature of the belt itself. In such a manner, the cooled belt is able to remove a higher amount of heat from ashes (the metallic belt conveys heat to water which suddenly evaporates through very fine drops). It is likely that, because of the ash temperature of about 800° C., temperature rates on belt plates of about 300–350° C. are generated while, by inserting sprayers, said heat rate could be lowered to about 150–200° C. A plate temperature sensor could meter the desired amount of water so that condensate development can be avoided.

Where the measures used for the purpose of increasing cooling of solid material are not enough, material mixing means could be used in order to
mix material on the belt in order to make its temperature uniform; and
increase the contact surface between hot solid material and cool air.
These means could be:
spoon mixers (c) mounted on axes normal to the belt 14 direction, which mixers are driven by material itself (see FIGS. 14a and 14b); said mixers c, installed along one or more lines and staggered, in order to act on the whole material provide for moving material upwardly and dropping it back on bed, exposing a main part of solid particle to the cooling action of air. Where required, the spoon mixers could be driven by a motor by the material itself.
insertion of plowshares 54, fixed in such a manner that solid material laid on belt can be mixed (see FIGS. 10 and 11). It is known that ashes have low heat conductibility characteristics, whereby their mixing could obtain a uniform temperature of solid particles in an effective manner. Such devices could be especially useful when, because of particular reasons (for example high material capacity), it is necessary to have material layers of relatively large height. Moreover the plowshares 54 can include inner channels 56 for conducting air which could be blown into the solid material 18, also for the purpose of increasing the heat exchange with the cooling air. Each single inner channel 56 will be connected to a main air feeding channel 58. To the end of reducing erosion, a coating of ceramic material could be carried out on the external plowshare surface. The plowshares are connected in an oscillating manner and they are free to rotate around the main channel 58 which further acts as a supporting shaft so that any erratic matter (i.e. pieces having exceptional sizes) can pass therethrough. A counterweight or elastic counteracting system move back plowshares into operating position. According to the heat exchange needed for obtaining the desired temperature value, one or more lines of staggered plowshares 54 can be added.

Clearly, when one believes necessary to use said mixing means, the material layer, unlike what is indicated for the first kind of use of the cooling belt, will be sufficiently thick in order to allow a substantial penetration of the mixing means into the solid material.

The first mixers (spoon mixers) will be generally used for fine materials which cannot cause blocking of spoons; the second mixers (plowshares) could be used when such a blocking is possible. Indeed in this case the plowshares may rise rotating around the rod to which they are pivoted.

In a preferred embodiment the discharge tubes will be finned in such a manner as to provide an effective cooling and higher heat recovery which is particularly convenient in such an embodiment.

In addition to solve all the prior art shortcomings, the present invention has the further advantage that when the material exits from conveyor/cooler, said material is completely dried. This is an important feature in processes such as waste burning wherein ashes must be subjected to further treatments such as sintering or vitrification, in other words they are a secondary product. Ash drying treatments of conventional apparatus are here avoided.

It is apparent that modifications, changes, adaptations and substitutions of parts can be made in the embodiments disclosed as illustrative and not limitative without departure from the scope of protection defined by the following claims.

What is claimed is:

1. A Conveyor/cooler of hot loose solid materials produced by fluid bed boilers or various industrial processes comprising:

one or more discharge channel(s) substantially vertical or at any inclination along which, because of gravity, the hot loose solid material leaves an area wherein the hot loose solid material is generated;

a sealed metallic container connected to a downstream end of said one or more discharge channel(s);

a conveyor belt disposed within said container and driven by a motor; and a speed changer for changing an advancing belt speed, the speed changer being operatively coupled to an overpressure sensor and responsive to a signal from the overpressure sensor, a material flow rate being provided by a set belt speed for a given thickness of a material layer on the belt, wherein the hot loose solid material from the downstream end of said one or more discharge channel(s) is layered forming a continuous travelling material bed on the conveyor belt, wherein said belt is adapted to absorb heat from the hot loose solid material and deliver heat to air inside the conveyor/cooler, wherein a distance between said downstream end of discharge tube(s), said one or more discharge channel (s), and the belt is set to allow passage of pieces of material having a predetermined largest supposed size, and wherein said one or more discharge channel(s), when full of the hot loose solid material, forms a plug for separation of pressure between said container and said area wherein the hot loose solid material is generated.

2. A conveyor/cooler according to claim 1, further comprising an adjusting loop composed of a transmitter of a variable to be controlled, a controller for outputting an output signal and a frequency converter for adjusting a number of revolutions of the motor driving a belt movement, said adjusting loop automatically adjusting the material flow rate.

3. A conveyor/cooler according to claim 1, wherein said container is adapted to maintain a pressure in the container that is lower than a pressure outside said container.

4. A conveyor/cooler according to claim 3 further comprising a heat recovery device for recovering the heat which has been taken from the hot loose solid material, said heat recovery device comprising an additional primary or a secondary fan for bringing air exiting from the container to a requested pressure and for introducing said air exiting from the container into a boiler chamber of combustion thus joining said air exiting from the container to a secondary or primary combustion air supply.

5. A conveyor/cooler according to claim 3, further comprising an air discharge device for discharging external air which has absorbed heat into the atmosphere, said air discharge device comprising a filter for filtering the heated air before discharging the heated air.

6. A conveyor/cooler according to claim 1, further comprising a device for taking cooling air delivered by a fan, for introducing the cooling air into the container of the conveyor/cooler and finally for introducing the cooling air into the boiler, wherein the pressure inside the container is higher than the pressure outside the container.

7. A conveyor/cooler according to claim 6 wherein all possible exits for dust-laden air from the container are housed within a chamber, said chamber being maintained at a pressure higher than the pressure inside the container.

8. A conveyor/cooler according to claim 7, wherein at least one inner wall of said chamber is made of a transparent material so as to allow inspection of the chamber from outside.

9. A conveyor/cooler according to claim 1, wherein in order to increase heat exchange between cooling air and the hot loose solid material, material mixers are provided and are connected in such a manner as to mix the hot loose solid material, said mixers being free to rotate around a main shaft.

10. A conveyor/cooler according to claim 9 wherein said mixers are plowshares, said plowshares comprising an inner channel connected to a main air feeding channel closed within and substantially formed by said main shaft.

11. A conveyor/cooler according to claim 9, wherein said mixers are spoon mixers and the spoon mixers are placed along one or more lines and driven by the material itself or by a motor.

12. A conveyor/cooler according to claim 1, wherein said one or more discharge channel(s) are provided with a safety mechanical control device and sensor which control a discharged material level.

13. A conveyor/cooler according to claim 1, further comprising a scraper for scraping settled material powders from a bottom of the container and for discharging the material powders.

14. A conveyor/cooler according to claim 1, wherein the conveyor belt is adapted to carry the continuous traveling material bed in substantially the same direction as a top side that in which of the conveyor belt moves.

15. A method for conveying and cooling hot loose solid materials produced by fluid bed boilers or various industrial processes comprising the steps of:

discharging the hot loose solid material through one or more discharge channel(s) to a sealed metallic container, said one or more discharge channel(s) forming a plug for separation of pressure between said container and an area wherein the hot loose solid material is generated when said one or more discharge channel(s) are full of the hot loose solid material;

dropping the hot material on a conveyor belt driven by a motor forming a continuous travelling material bed on the conveyor belt;

absorbing heat to the belt from the hot loose solid material; and delivering said heat to air inside the container, wherein as the thickness of a material layer on the belt is set, a material flow rate is adjusted by changing an advancing belt speed according to a signal from an overpressure sensor.

16. A method according to claim 15, wherein said material flow rate adjustment is automatically carried out by an adjusting loop composed of a transmitter of a variable to be controlled, a controller for outputting an output signal, and a frequency converter adjusting the number of revolutions of the motor driving the belt movement.

17. A method according to claim 15, further comprising the step of maintaining the pressure inside the container lower than the pressure outside said container.

18. A method according to claim 17, wherein said conveying and cooling allows recovery of heat which is taken from the hot loose solid material, said heat recovery being carried out through a vacuum in which said container works and by introducing the heated air into a boiler chamber of combustion thus joining said air exiting from the container to a primary or a secondary combustion air supply through an additional secondary or primary fan, respectively, which brings air exiting from the container to a requested pressure.

19. A method according to claim 17 wherein said conveying and cooling does not allow recovery of heat taken from the material to be cooled, the external air which has absorbed heat being discharged into the atmosphere after being filtered by using a chimney effect or an expulsion fan.

20. A method according to claim 15 wherein said conveying and cooling operates under pressure by taking cooling air delivered by a primary or a secondary fan, respectively, whereby said cooling air, before entering the boiler, travels through the container and is heated by the material.

21. A method according to claim 15, wherein in proximity of a downstream end of said one or more discharge channel(s), the hot loose solid material is metered to avoid emptying of said one or more discharge channel(s) and to allow passage of pieces having exceptional sizes.

22. A method according to claim 15, further comprising scraping material powders settled from a bottom of the container and discharging the material powders.

23. A method according to claim 15, further comprising: moving the continuous travelling material bed in substantially the same direction as of the conveyor belt moves.

* * * * *